US008530683B2

(12) United States Patent
Baird et al.

(10) Patent No.: US 8,530,683 B2
(45) Date of Patent: Sep. 10, 2013

(54) METHOD OF OBTAINING A SOLID COMPONENT RICH IN A PETROSELINIC COMPOUND

(75) Inventors: Mark Stephen Baird, Gwynedd (GB); David Preskett, Gwynedd (GB)

(73) Assignee: Bangor University, Gwynedd (GB)

( * ) Notice: Subject to any disclaimer, the term of this patent is extended or adjusted under 35 U.S.C. 154(b) by 358 days.

(21) Appl. No.: 12/810,001

(22) PCT Filed: Dec. 22, 2008

(86) PCT No.: PCT/GB2008/051222

§ 371 (c)(1),
(2), (4) Date: Sep. 21, 2010

(87) PCT Pub. No.: WO2009/081209

PCT Pub. Date: Jul. 2, 2009

(65) Prior Publication Data

US 2011/0009487 A1 Jan. 13, 2011

(30) Foreign Application Priority Data

Dec. 21, 2007 (GB) .................................. 0724963.4

(51) Int. Cl.
*C11B 1/10* (2006.01)
*C11B 3/02* (2006.01)
*A23L 1/28* (2006.01)

(52) U.S. Cl.
USPC .................. 554/8; 554/174; 554/160; 554/9; 554/12; 554/13; 554/20; 426/655

(58) Field of Classification Search
None
See application file for complete search history.

(56) References Cited

U.S. PATENT DOCUMENTS

| | | | | |
|---|---|---|---|---|
| 5,002,767 A * | 3/1991 | Masse | ........................... | 424/725 |
| 6,365,175 B1 * | 4/2002 | Alaluf et al. | .................. | 424/439 |
| 6,395,286 B1 * | 5/2002 | Pillai et al. | .................... | 424/401 |
| 2002/0136786 A1 | 9/2002 | Newmark et al. | | |

FOREIGN PATENT DOCUMENTS

| | | |
|---|---|---|
| EP | 0777971 A1 * | 6/1997 |
| EP | 0709084 A3 | 8/1997 |
| EP | 0867169 A1 | 9/1998 |
| GB | 2182943 A | 5/1987 |
| WO | 0108653 A1 | 2/2001 |

OTHER PUBLICATIONS

Placek, L.L. et al., A review on Petroselinic Acid and its derivatives, 1963, Journal of the American Oil Chemists' Society (JAOCS), vol. 40, No. 8, pp. 319-329.*

Ramadan, M.F., et al., Oil compositin of coriander (Coriandrum sativm L.) fruit seed, 2002, Eur. Food Res. Technol., 215:204-209.*

EP 0709084, Laugier et al., Use of an oil rich in petroselinic acid as hydrating agent, 1996, English translation of specification, (7 pages).*

(Continued)

*Primary Examiner* — Yate K Cutliff

(74) *Attorney, Agent, or Firm* — Stephen F. Swinton, Jr.; Hoffman Warnick LLC

(57) ABSTRACT

A method of obtaining a solid component rich in a petroselinic compound from the seed of a plant of the Apiaceae or Araliaceae families, the method comprising: (a) treating a portion of the seed of the plant with an extraction solvent; and (b) inducing formation of the solid component.

14 Claims, 1 Drawing Sheet

(56) References Cited

OTHER PUBLICATIONS

Kleiman, R. et al., Search for new industrial oils: XVI. Umbelliflorae-seed oils rich in petroselinic acid, 1982, JAOCS, vol. 59, No. 1, pp. 29-38.*

Fore, S.P. et al., Preparatin of Petroselinic acid, JAOCS, 1960, vol. 37, No. 10, pp. 490-491.*

Knothe et al., Biodiesel: The use of vegetable oils and their derivativees as alternative diesel fuels, 1997, American Chemical Society, Chapter 10, pp. 172-207.*

Destaillats et al., "Dibutyrate Derivatization of Monoacylglycerols for the Resolution of Regioisomers of Oleic, Petroselinic, and cis-Vaccenic Acids", 2002, pp. 111-116, LIPIDS, vol. 37, No. 1 (XP-002521459).

Chobanov et al., "Preparation of Pure Petroselinic Acid", Nov. 1966, pp. 625-626, The Journal of the American Oil Chemists' Society, vol. 43, No. 11 (XP-002521460).

Hasenhuettl: Kirk Othmer Encyclopedia of Chemical Technology, "Fats and Fatty Oils", Feb. 2005, pp. 801-836, Copyright John Wiley & Sons (XP-002521462).

Hilditch et al., "Seed Fats of the Umbelliferae", 1928, pp. 326-330, Biochemistry Journal, vol. 1928, No. 22 (XP-002521461).

PCT Application No. PCT/GB2008/051222, filed Dec. 22, 2008, "International Search Report and Written Opinion", Date of Completion Mar. 27, 2009, 10 pages.

Wang et al., "Recent advances in extraction of nutraceuticals from plants," 2006, pp. 300-312, Trends in Food & Technology, vol. 17.

* cited by examiner

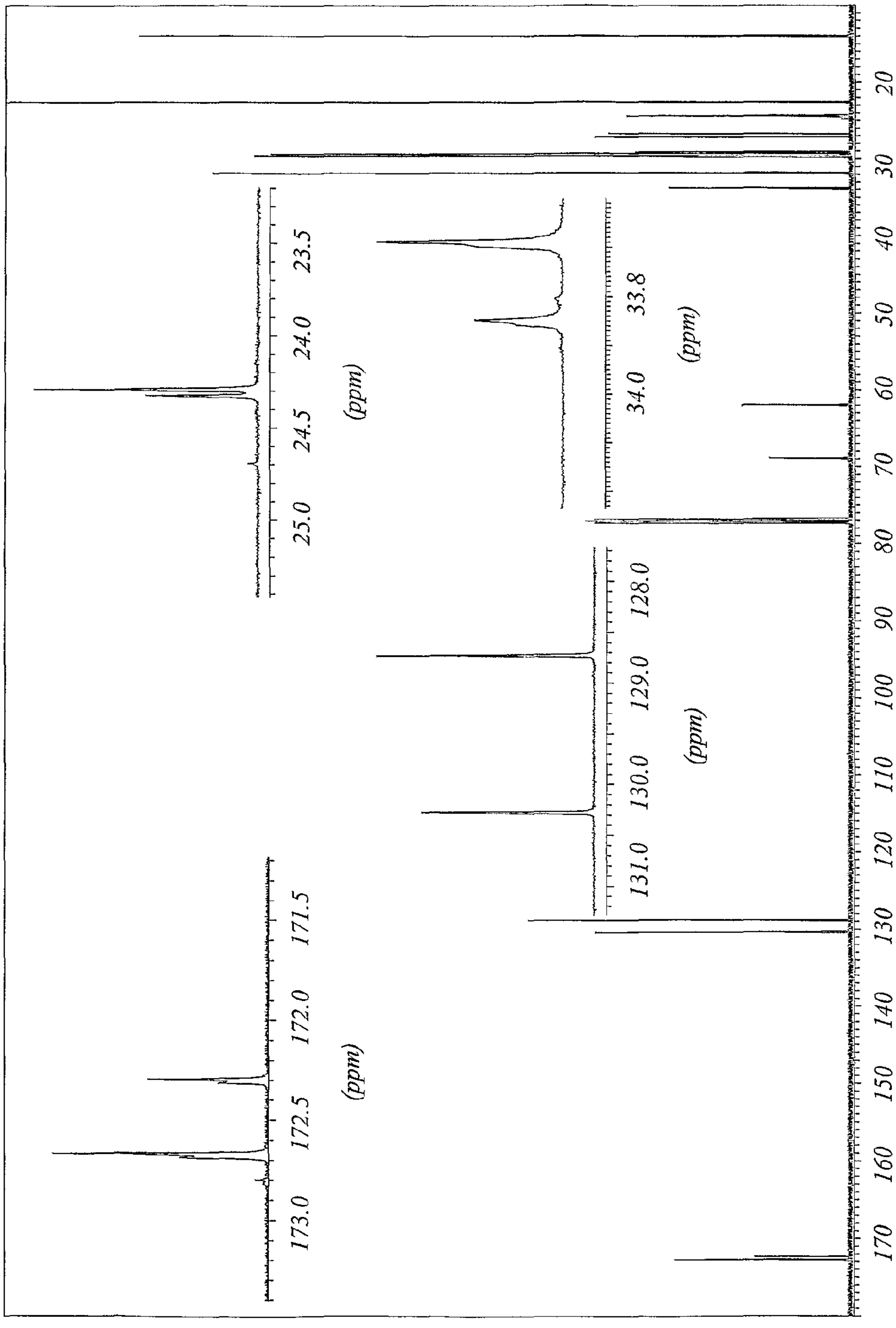
20
30
40
50
60
70
80
90
100
110
120
130
140
150
160
170
23.5
24.0
24.5
25.0
(ppm)
33.8
34.0
(ppm)
128.0
129.0
130.0
131.0
(ppm)
171.5
172.0
172.5
173.0
(ppm)

METHOD OF OBTAINING A SOLID COMPONENT RICH IN A PETROSELINIC COMPOUND

The present invention relates to a method of obtaining petroselinic acid and compounds thereof. In particular, the invention relates to a method of obtaining petroselinic acid from natural sources in high purity.

Petroselinic acid has the structure shown in FIG. 1.

FIG. 1

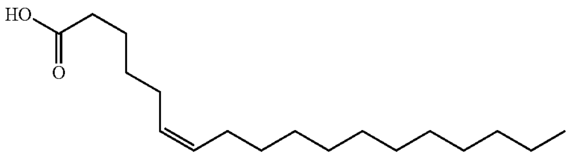

Petroselinic acid is a useful material. It is monounsaturated but has similar physical characteristics to saturated fatty acids at room temperature. Petroselinic acid and derivatives thereof may be used to replace saturated fats in, for example, dietary applications. It may also be used as a substitute for partially hydrogenated fats. Partially hydrogenated fats often include a double bond having a trans configuration. These "trans fats" are known to be damaging to human health if ingested on a regular basis.

The present inventors have found that some species of the Apiaceae and Araliaceae plant families include high concentrations of petroselinic acid, typically as the glycerol triester, known as tripetroselinin. The structure of tripetroselinin is shown in FIG. 2.

FIG. 2

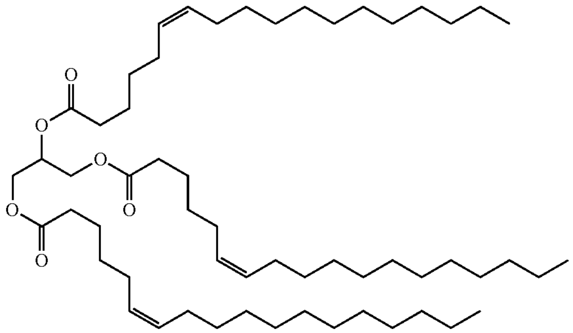

Previous methods of obtaining this compound from natural sources involved extracting a mixture containing the glycerol triester of petroselinic acid along with compounds of other fatty acids; hydrolysing this mixture to provide a mixture of free acids; followed by a complex separation of petroselinic acid from other fatty acids; and then re-esterifying to the glycerol triester. The only method of the prior art to provide a clean sample of tripetroselinin from natural sources is molecular distillation, although in this case the yield was poor. Petroselinic acid itself has been obtained from fennel seeds by acid soap crystallisation followed by two urea segregations.

The present inventors have found a simple method by which a solid component rich in petroselinic acid (for example as either the free acid or the glycerol triester) can be obtained from plants of the Apiaceae and Araliaceae families. The seeds of these plants in particular have been found to be rich in petroselinic acid compounds.

The Apiaceae family of plants include the genera *Anethum, Anthriscus, Angelica, Apium, Arracacia, Carum, Centella, Conium, Coriandrum, Cuminum, Daucus, Eryngium, Foeniculum, Levisticum, Myrrhis, Pastinaca, Petroselinum, Pimpinella* and *Smyrnium.*

Of the genera of species in the Apiaceae family, the present invention relates in particular to those of the tribe smyrnieae. The 38 species of the smyrnieae tribe include *Smyrnium olusatrum* and *Smyrnium perfoliatum.*

The Araliaceae family of plants comprises two subfamilies, the Araliodideae and the Hydrocotyloideae subfamilies. The genera of plants covered by the Araliodideae subfamily include *Anakasia, Apiopetalum, Aralia, Arthrophyllum, Astrotricha, Boninofatsia, Brassaiopsis, Cephalaralia, Cheirodendron, Cromapanax, Cuphocarpus, Cussonia, Dendropanax, Eleutherococcus,* ×*Fatshedera, Fatsia, Gamblea, Gastonia, Harmsiopanax, Hedera, Heteropanax, Hunaniopanax, Kalopanax, Mackinlaya, Macropanax, Megalopanax, Merrilliopanax, Meryta, Metapanax, Motherwellia, Munroidendron, Oplopanax, Oreopanax, Osmoxylon, Panax, Polyscias, Pseudopanax, Pseudosciadium, Raukaua, Reynoldsia, Schefflera, Sciadodendron, Seemannaralia, Sinopanax, Stilbocarpa, Tetrapanax, Tetraplasandra, Trevesia* and *Woodburnia.*

The subfamily Hydrocotyloideae includes the genera *Azorella, Centella, Hydrocotyle, Platysace* and *Xanthosia.*

Of the genera of species in the Araliaceae plant family, the present invention relates in particular to those of the *Hedera* genus. Species of the *Hedera* genus include *Hedera algeriensis, Hedera azorica, Hedera canariensis, Hedera caucasigena, Hedera colchica, Hedera cypria, Hedera helix, Hedera hibernica, Hedera maderensis, Hedera maroccana, Hedera nepalensis, Hedera pastuchowii, Hedera rhombea, Hedera sinensis* and *Hedera taurica.*

According to a first aspect of the present invention there is provided a method of obtaining a solid component rich in a petroselinic compound from the seed of a plant of the Apiaceae or Araliaceae families, the method comprising:

(a) treating a portion of the seed of the plant with an extraction solvent; and (b) inducing formation of the solid component.

By "a component rich in a petroselinic compound" we mean to include materials which include high levels of petroselinic acid either as the free acid or as an ester or salt thereof. In particular the component may be rich in the free acid and/or the glycerol triester of petroselinic acid, tripetroselinin.

Step (a) of the present invention comprises treating a portion of seed of a plant of the Apiaceae or Araliaceae families. It will be appreciated that this may include treating a portion or plant comprising only the seed or it may include treating a portion of plant comprising seed along with other plant material, for example the whole fruit including the seed, or a portion of plant including the seed along with leaf and/or bark and/or fruit. Preferably however the portion of plant on which step (a) is carried out comprises mostly seed.

The method may be carried out on a portion of seed taken from a single plant species or it could be carried out on a portion of seed taken from a mixture of species. Preferably the portion of seed is taken from single species.

In one preferred embodiment, the portion of seed comprises *Smyrnium olusatrum*, a plant which is also known as Alexanders or Horse Parsley. In another preferred embodiment, the portion of seed comprises *Hedera helix*, which is also known as English ivy. These plants are not now commonly used as human foodstuff.

The seeds may be harvested by any suitable means. They may be harvested by hand or by mechanical means, for example using flails, combined harvesting, by beating or by cutting. Vacuum assisted methods could also be used.

The method of the present invention is most preferably carried out on ripe or mature seeds, that is seeds that have fully developed before harvesting.

Preferably the portion of seed is formed into a comminuted form prior to step (a). This may involve taking a sample of the seed and forming it into a paste, for example using a food processor, a pestle and mortar or a mincer. Alternatively the seed may be chopped or shredded using a knife or other cutting implement. In some preferred embodiments the seed is processed by hammermilling or grinding into the comminuted form.

In some embodiments the portion of seed is dried prior to step (a). This may be before and/or after the seed is formed into a comminuted form. Preferably the portion of seed is processed to provide a comminuted form after drying.

In some embodiments seed may be air-dried. This may simply comprise leaving the seeds exposed to air, suitably under ambient conditions; or it may comprise blowing air through the portion of seed.

Alternatively such a drying step may comprise heating the portion of seed in an oven. Typically this may be for at least an hour, preferably at least four hours, more preferably at least ten hours, for example at least sixteen hours, preferably at least twenty hours. Drying may comprise heating in an oven for up to a week, for example up to three days, for example up to forty hours, for example up to thirty hours.

The drying step may involve heating in an oven at a temperature of at least 35° C., preferably at least 40° C., for example at least 50° C. The drying step may be carried out in an oven having a temperature of up to 250° C., preferably up to 200° C., for example up to 150° C., or up to 120° C. Oven temperatures of 50-60° C. or 80-90° C. may typically be used. Preferably air is circulated over the portion of plant during the drying process.

The drying step suitably reduces the water content of the portion of seed to be treated in step (a). Preferably the portion of seed treated in step (a) comprises less than 20 wt % water, preferably less than 10 wt %, more preferably less than 5 wt %.

Suitable extraction solvents for use in step (a) include alcohols, hydrocarbons and mixtures thereof, ethers, chlorinated solvents, ketones, esters and mixtures thereof. Suitable alcohols include methanol, ethanol, propanol, isopropanol and butanol. Suitable ethers include diethyl ether, tertiarybutylmethyl ether and tetrahydrofuran. Suitable chlorinated solvents include dichloromethane and chloroform. Suitable hydrocarbons include hexane, heptane and octane. Hexane is particularly preferred. Also useful are mixtures of hydrocarbons, for example those obtained from the fractional distillation of crude oil having a boiling point of 40 to 60° C. (hereinafter 40-60 petrol), or those having a boiling point of 60 to 80° C. (hereinafter 60-80 petrol). Preferred ketones include acetone and a preferred ester is ethyl acetate.

Supercritical fluids, for example supercritical carbon dioxide could also be used as an extraction solvent. In some embodiments the extraction solvent may comprise an aqueous base, for example of sodium hydroxide which would lead to extraction of the acid as, for example, the sodium salt. Alternatively it may comprise an alcoholic mixture comprising an acid or base, for example methanol and sodium methoxide. In such embodiments a different ester of petroselinic acid may be extracted, for example the methyl ester.

Preferred solvents for use in step (a) are acetone, dichloromethane, tertiarybutyl methyl ether, hexane and 40-60 petrol. In some embodiments the extraction solvent is substantially free of any acid or base.

In some embodiments step (a) comprises heating a portion of the seed in the extraction solvent. This may be at a temperature of at least 30° C., for example at least 35° C. The extraction may be carried out by heating at a temperature of up to 150° C., for example up to 100° C., for example up to 80° C., for example up to 70° C., or up to 65° C. Suitably step (a) comprises heating a portion of plant in refluxing solvent.

In some embodiments extraction step (a) is suitably carried out by heating a portion of seed in the extraction solvent for at least 1 hour, for example at least 6 hours, preferably at least 10 hours, more preferably at least 18 hours, for example at least 30 hours.

The seed may be heated in the solvent for up to a week, for example up to 5 days, preferably up to 3 days.

In other embodiments, step (a) may involve a rapid extraction, for example taking less than an hour or less than 30 minutes.

Step (a) may comprise heating a portion of the seed in an extraction solvent for more than one period. A further solvent sample may be added and the heating repeated.

In some embodiments step (a) may involve a continuous extraction of fatty acid compounds. Preferably it is carried out using apparatus which allows percolation of the solvent and soaking of the portion of seed therein. The portion of seed may be suspended loosely in the solvent or held within a removable container.

In some embodiments step (a) does not comprise heating the portion of seed in an extraction solvent. For example, the portion of seed may be allowed to stand in the extraction solvent at ambient temperature with or without agitation. It may suitably be allowed to stand without agitation in the extraction solvent for a period of at least 4 hours, preferably at least 12 hours, more preferably at least 24 hours, for example at least 36 hours.

It may be allowed to stand for up to 7 days, for example up to 5 days or up to 3 days. Ambient temperature is typically between 15 and 25° C.

In embodiments in which the extraction solvent comprises a supercritical solvent, for example supercritical carbon dioxide, heating may not be necessary. The use of supercritical carbon dioxide as a reaction solvent has a number of advantages, for example it is non-toxic, can be allowed to simply evaporate at the end of a reaction and may allow reactions to be carried out at lower temperatures.

Step (a) may include the use of a microwave or a sonicator with or without heating to assist extraction of fatty acid-containing compounds into the extraction solvent.

A review paper, Recent advances in extraction of nutraceuticals from plants, Lijun Wang and Curtis L. Weller, Trends in Food Science & Technology, 17 (2006), 300-312, details a number of extraction methods which could suitably be used in step (a) of the process of the present invention.

Suitably the mass of seed heated in the solvent in step (a) is at least 50 g/L, for example at least 80 g/L, preferably at least 100 g/L. Mass ratios of up to 2000 g/L, for example up to 1000 g/L or 500 g/L are suitable. Mass ratios of for example 100 g/L to 400 g/L may be used.

Following step (a), it is usually necessary to remove the portion of seed from the extraction solvent. By this stage the extraction solvent will have dissolved therein fatty acid compounds. In some embodiments it may be possible to lift out the seed, for example in a container or basket. In other cases solvent may be removed by decanting, filtration or centrifugation.

The extract thus obtained in step (a) may be used directly in step (b) or it may be first concentrated. If concentrated, this may be achieved by simply allowing the extraction solvent to evaporate over a period of time, or the extract obtained in step (a) may be concentrated in vacuo or removed by atmospheric pressure distillation. If the extract obtained in step (a) is concentrated, some or all of the extraction solvent may be removed.

In some embodiments in which a hot solvent is used in step (a), fatty acid residues may separate out from the extraction solvent as it is cooled. For example when seeds of *Hedera helix* are heated in refluxing ethanol, triglyceride compounds dissolve in the ethanol. If the mixture is left to stand on cooling, a fatty-acid layer may form, for example in the bottom of the vessel which can be easily separated from the extraction solvent. Similar separation may be possible using other plants and/or solvents.

Alternatively step (a) may be followed by a process to remove some unwanted compounds which may have been coextracted. For example, washing with an appropriate solvent or solvents may facilitate separation of polar material.

Step (b) may be carried out on the extract obtained step (a), or on the partial or substantially completely concentrated extract obtained in step (a), or on a separated portion of the extract obtained in step (a). Alternatively the concentrated extract may be redissolved in a further solvent prior to carrying out step (b).

The crude extract obtained in step (a) may itself be of commercial utility and could be used directly in a number of applications. For example it could be used as a biofuel. To improve its utility as a biofuel it may be first converted to a mixture of fatty acid esters, for example fatty acid methyl esters.

Step (b) may comprise any method which induces the formation of the solid component. Preferably step (b) comprises inducing crystallisation of the solid component.

Step (b) may comprise removing solvent from the extract obtained in step (a). For example it may be that the petroselinic compound precipitates out of solution once the concentration reaches a certain level.

Step (b) may comprise seeding the crystallisation of the petroselinic compound for example by introducing a crystal of the compound into a solution thereof, by scratching the side of a glass vessel containing such a solution, by the addition of a nucleating agent or by any other method known to those skilled in the art.

Preferably step (b) does not comprise adding urea to the material extracted in step (a).

Preferably step (b) comprises cooling the material extracted in step (a).

In this specification the solvent in which the extracted material is cooled in step (b) is hereinafter referred to as the cooling solvent. In some embodiments the concentrated extract may be cooled directly, in which case no cooling solvent is present. Preferably however there is a cooling solvent.

The cooling solvent may be the extraction solvent. The cooling solvent may be different to the extraction solvent but may be the same solvent. For example acetone could be used in both cases but the extraction solvent removed after step (a) before redissolving the concentrated extract in further acetone for use in step (b).

Suitable cooling solvents for use in step (b) include alcohols, hydrocarbons and mixtures thereof, ethers, chlorinated solvents, ketones, esters and mixtures thereof. Suitable alcohols include methanol, ethanol, propanol, isopropanol and butanol. Suitable ethers include diethyl ether, tertiarybutylmethyl ether and tetrahydrofuran. Suitable chlorinated solvents include dichloromethane and chloroform. Suitable hydrocarbons include hexane, heptane, octane and mixtures of hydrocarbons, for example 40-60 petrol. Preferred ketones include acetone and a preferred ester is ethyl acetate. Preferred cooling solvents are hexane, 40-60 petrol, ethanol and acetone.

Preferably the extracted material is present in the cooling solvent in an amount of at least 10 $gdm^{-3}$. Preferably at least 25 $gdm^{-3}$, more preferably at least 50 $gdm^{-3}$. It may be present in an amount of up to 1000 $gdm^{-3}$, for example up to 800 $gdm^{-3}$, preferably up to 600 $gdm^{-3}$.

Preferably in step (b) the extracted material is cooled to a temperature (hereinafter the cooling temperature) of below 10° C., preferably below 5° C., more preferably below 2.5° C., preferably below 1.5° C., for example below 0° C., for example below −2.5° C. or below −5° C. It may, for example however be cooled to a temperature of less than −10° C., for example less than −15° C. or less than −20° C.

In one preferred embodiment in which the portion of plant comprises *Smyrnium olusatrum*, the extracted material is cooled to a temperature of between −5 and −15° C., for example about −10° C. during step (b). In another preferred embodiment in which the portion of plant comprises *Hedera Helix*, the extracted material is cooled to a temperature of between −5 and 5° C., for example about 1° C. during step (b).

Preferably in step (b) the material is maintained at the cooling temperature for a period of least 1 hour, preferably at least 4 hours, for example at least 8 hours or at least 12 hours. It may be held at this temperature for a period of at least 18 hours or at least 24 hours. In some embodiments it may be held at this temperature for 48 hours, 72 hours or even 96 hours.

After step (b) a solid component rich in petroselinic compounds has formed. This may be collected by decanting the cooling solvent, centrifugation or filtration. In some embodiments it may be washed on the filter, for example with cold solvent.

The mother liquor may be retained and concentrated and/or cooled to obtain further portions of the solid component. The solid component itself may be recrystallised, from a recrystallisation solvent to improve the purity thereof if necessary. Suitable recrystallisation solvents include the cooling solvents listed above.

In some embodiments in which the process is substantially as defined above, the solid component comprises tripetroselinin, that is the glycerol triester of petroselinic acid. In such embodiments the solid component preferably comprises at least 50 wt % tripetroselinin, preferably at least 60 wt %, more preferably at least 70 wt %, for example at least 75 wt %, preferably at least 80 wt %, preferably at least 85%, more preferably at least 90 wt %, preferably at least 95% wt %, more preferably at least 97 wt % and most preferably at least 99 wt % tripetroselinin.

A number of polymorphs of tripetroselinin exist. Preferably when the solid component of the present invention comprises tripetroselinin, this suitable comprises predominantly the β-polymorph thereof.

In some embodiments the solid component may comprise petroselinic acid as the free acid. This may be obtained by a number of methods. As described above, the free acid or a salt thereof may be directly extracted from the seed portion in step (a) by the use of a basic solution as the extraction solvent.

Alternatively the free acid of petroselinic acid may be obtained by introducing an additional step between steps (a) and (b) of hydrolysing the extract obtained in step (a).

Alternatively the method may include a step (c) of hydrolysing the tripetroselinin obtained in step (b) to form the free fatty acid. Hydrolysis of the triglyceride obtained after step (a) or step (b) may be achieved by treatment with acid or a base, for example aqueous sodium hydroxide or sulphuric acid, preferably with heating. Suitably the triglyceride is treated with aqueous acid or base having a concentration of between 0.01 and 5 M for 0.1 to 12 hours. Base hydrolysis would provide the salt of the acid. The free acid could readily be obtained by acidification, as would be easily understood by the person skilled in the art.

In embodiments in which the present invention provides petroselinic acid as the free acid, the solid component preferably comprises at least 50 wt % petroselinic acid, preferably at least 60 wt %, more preferably at least 70 wt %, for example at least 75 wt %, preferably at least 80 wt %, preferably at least 85%, more preferably at least 90 wt %, preferably at least 95% wt %, more preferably at least 97 wt % and most preferably at least 99 wt % petroselinic acid.

In some embodiments the solid component may comprise petroselinic acid as an ester of a monoalcohol, preferably an alcohol having 1 to 4 carbon atoms, for example methanol or ethanol. This may be obtained by a number of methods. As described above, the methyl or ethyl ester may be directly extracted from the seed portion in step (a) by the use of a basic or acidic alcoholic solution as the extraction solvent.

Alternatively the methyl or ethyl ester of petroselinic acid may be obtained by introducing an additional step between steps (a) and (b) of transesterifying the extract obtained in step (a), suitably under acidic or basic conditions.

In embodiments in which the present invention provides the methyl or ethyl ester of petroselinic acid the solid component preferably comprises at least 50 wt % of said ester, preferably at least 60 wt %, more preferably at least 70 wt %, for example at least 75 wt %, preferably at least 80 wt %, preferably at least 85%, more preferably at least 90 wt %, preferably at least 95% wt %, more preferably at least 97 wt % and most preferably at least 99 wt % of the relevant ester.

Further esters of petroselinic acid could be made by analogous methodology and are within the scope of the present invention.

The present invention further provides the use of the petroselinic compounds obtained by the method of the first aspect in a variety of applications.

Such petroselinic acid compounds could, for example, be used as biofuels, for example as biodiesel. Esters of monoalcohols, especially the methyl ester are particularly useful in this regard. The crude extract obtained in step (a) or the methyl ester thereof could also be used as a biofuel. It would also be possible to use residual fatty acid material which remains following the crystallisation of petroselinin acid as a biofuel, particularly if this is converted to fatty acid methyl esters.

The solid component obtained in the process of the present invention could be used to replace saturated fats or partially hydrogenated "trans fats" in dietary applications. The tripetroselinin compound would be particularly useful for this purpose. It could for example be used as an oil for frying foods.

The solid component may also find use in skincare applications. For example, free petroselinic acid or a derivative thereof may be incorporated into a topical formulation.

Petroselinic acid obtained by the method of the present invention could also be useful in the preparation of food compositions or food supplements.

The solid component of the present invention may also find utility as a solid lubricant or as a chemical feedstock. For example, ozonolysis of petroselinic acid provides adipic acid, a precursor to nylon; and lauric acid which is used to make the surfactant sodium lauryl sulphate.

The invention will now be further described with reference to the following non-limiting examples.

Unless otherwise indicated, $^{1}$H-NMR spectroscopy refers to experiments performed on a Bruker 500 MHz spectrometer. For all $^{13}$C-NMR experiments the acquisition of all samples, unless indicated otherwise, was with 1024 scans and a two second delay between scans with no special conditions. All TLC was carried out on glass backed silica gel plates. In all cases there were developed by brief immersion in a 5% solution of phosphomolybdic acid in EtOH followed by charring using a hot air gun.

Procedures quoting moisture content (m.c) or an oven dry weight (ODW) were established by drying a small sample in a 105° C. oven for 24 hours. The calculation of m.c. is given by:

$$\text{m.c.}=[(\text{wet weight}-\text{dry weight})/\text{wet weight}]\times 100$$

Equilibrium moisture content (EMC) refers to the moisture content of a sample with respect to ambient temperature and humidity.

In a number of the examples, the petroselinic acid or tripetroselinin obtained has been characterised by $^{1}$H and/or $^{13}$C NMR. By way of example, FIG. 1 shows the $^{13}$C NMR spectrum of tripetroselinin obtained in example 15.

EXAMPLE 1

Preparation of *S. Olusatrum* Seeds

Seeds (6 kg) were collected in November 2002 on Llanddona Beach, Anglesey. Following air drying, they were prepared by comminution to a coarse meal using a Christie Laboratory Mill fitted with a 1 mm sieve plate. The seed was stored in a freezer at −25° C. until required.

EXAMPLE 2

Extraction of Fatty Components of *S. Olusatrum* Seeds by Continuous Extraction Using TBME A portion of seed prepared according to example 1 (20.00 g) was weighed into a cellulose thimble and assembled on a Soxhlet continuous extraction funnel fitted to 500 ml round-bottomed flask containing tertiarybutylmethyl ether (TBME, 200 ml). The apparatus was heated at reflux for 45 hours. After cooling, solvent was removed on a rotary evaporator to yield a pale green oil (3.04 g). This oil could potentially be used without further purification, for example as a biofuel.

EXAMPLE 3

Extraction of Fatty Components of *S. Olusatrum* Seeds by Continuous Extraction Using 40-60 Petrol

*S. olusatrum* seeds (20 g) prepared according to example 1 were extracted as described in example 2 using 40-60 petrol (300 ml) at reflux until colourless solvent was observed in the upper chamber of the Soxhlet apparatus. On cooling, the solvent was removed on a rotary evaporator to recover a brown/green oil (2.98 g).

EXAMPLE 4

Extraction of Fatty Components of *S. Olusatrum* Seeds by Continuous Extraction Using Acetone Using the same method as described in example 2, seed prepared according to example 1 (20 g) was extracted using refluxing acetone (300 ml) with heating overnight. Following solvent removal on a rotary evaporator, a clear green oil (3.06 g) was obtained.

EXAMPLE 5

Extraction of Fatty Components of *S. Olusatrum* Seeds by Continuous Extraction Using DCM Using the method described in example 2, seed prepared according to example 1 (20 g) was heated in refluxing dichloromethane. Following solvent removal on a rotary evaporator, a clear green oil (3.35 g) was recovered.

EXAMPLE 6

Transesterification of Glycerol Triester from *S. Olusatrum*

Oil (0.41 g) obtained in example 2 was weighed into a 250 ml round bottomed flask. To this was added MeOH (20 ml) containing $H_2SO_4$ (98%, 0.1 ml). The mixture was heated at reflux for 4 hours and followed by TLC. Although the reaction was shown to be complete by TLC after 3 hours, it was allowed to continue for a further hour. The reaction mixture at the end had a purple colour. It was worked up by quenching with saturated aq. $NaHCO_3$ to neutral pH then extracting with EtOAc (50 ml). The organic layer was washed with water (50 ml×3) to provide a brown solution and then with brine (50 ml×2), and dried over $MgSO_4$. The solvent was removed on a rotary evaporator to recover an oil.

$^1$H-NMR 250 MHz analysis of the crude product confirmed that the reaction had reached completion.

Small, non-FAME (fatty acid methyl ester) signals could be seen in the $^1$H-NMR. Column chromatography was therefore used to purify the FAME component eluting with 10:0.5 hexane/EtOAc.

EXAMPLE 7

Extraction of Fatty Components of *S. Olusatrum* Seeds by Continuous Extraction Using DCM Seeds collected in June 2003 were hammer-milled then extracted as described in example 5 using DCM. The product had a grainy appearance. Petrol (50 ml) was added to dissolve the oil. This immediately caused a precipitate to form, which was removed via filtration and discarded. The solvent was removed on a rotary evaporator to recover a deep green oil (3.07 g, 15.35% at EMC). $^1$H- and $^{13}$C-NMR of the crude oil showed the principal component to be a glycerol triester of fatty acid, in addition to a significant proportion of non-fatty acid material. Examination of the double bond region (126-132 ppm) of the $^{13}$C-NMR spectrum clearly showed petroselinic acid to be the main unsaturated fatty acid.

EXAMPLE 8

Large Scale Extraction of Fatty Components from Seeds of *S. Olusatrum*

From seeds harvested and prepared according to example 1 in November 2002, a portion (2 kgs) was equally divided into two 2-litre flasks. The ground seeds were covered with DCM (1 L), briefly stirred with a glass rod, stoppered and left to stand overnight. The following day, the organic layers were decanted, combined and the solvent removed on a rotary evaporator. The process was repeated with the residues. Final recovery of the two combined extracts provided a dark green oil (208 g, 10% recovery). The oil showed the same overall NMR spectrum as that obtained in example 2.

EXAMPLE 9

Crude Oil Content of *S. Olusatrum* Seeds from Puffin Island

Seeds collected in August 2004 from Puffin Island were air dried to EMC then hammer-milled as described in example 1. To a portion (60.00 g) was added DCM (250 ml), and left for one week. The solvent was filtered and placed to one side while the procedure was repeated. The solvent extracts were combined in a stepwise removal on a rotary evaporator recovering an oil (11.99 g, 19.98% of the starting material) with a characteristic odour.

A separate sample of whole seed (4.22 g) was used for a moisture content determination giving a value of 14.05%. Therefore the extract was 23.28% of the ODW.

To a portion (1.00 g) of the extract was added a solution of $H_2SO_4$ (98%, 2 drops) in MeOH (30 ml). The mixture was reacted under reflux for 4 hours. Confirmation of completion was by TLC. Work up with 40-60 petrol (30 ml) and water (3×100 ml), drying over $MgSO_4$, and evaporation gave a light yellow oil (0.68 g).

Analysis of the $^1$H-NMR spectrum confirmed completion conversion to FAME.

EXAMPLE 10

Hydrolysis of FAME from *S. Olusatrum* Seeds

FAME (5.00 g) from example 14 was added to a solution of KOH (5.00 g) dissolved in MeOH (100 ml). Water (20 ml) was then added. The mixture heated under reflux for three hours and monitored by TLC.

The product was worked up was with water (70 ml) and DCM (2×100 ml). The organic layer was separated and the solvent removed on a rotary evaporator affording a thick, viscous, sweet-smelling, yellow oil (1.08 g). This was not examined further. The aqueous layer was brought to pH 1 by the dropwise addition, with stirring, of 98% $H_2SO_4$. DCM (4×100 ml) was added to dissolve the oil layer that appeared on the aqueous layer; these organic layers were combined, dried over $MgSO_4$, filtered and solvent removed on a rotary evaporator affording a dark yellow oil (3.33 g, 66.7% recovery). $^1$H- and $^{13}$C-NMR spectra were obtained of the oil and showed the formation of FFA (free fatty acid).

EXAMPLE 11

Preparation of FFA from Seed Oil of *S. Olusatrum*

KOH (10 g) was dissolved in MeOH (100 ml). To this was added oil (20 g) obtained in example 8 and water (20 ml) then the mixture heated under reflux for 3 hours. Confirmation of completion was by TLC. The product was worked up was with water (100 ml) and DCM (200 ml) to form the first organic layer that was withdrawn, solvent removed on a rotary evaporator to recover a thick, viscous, pleasant smelling oil (2.97 g), unlike the fresh milled seed. The aqueous layer was acidified slowly with $H_2SO_4$ (98%, 5 ml) to pH 1 then extracted with petrol (3×100 ml). The combined extracts were dried over $MgSO_4$, filtered and the solvent removed on a rotary evaporator recovering an oil (12.96 g). $^{13}$C-NMR spectra were obtained and compared with standards.

EXAMPLE 12

Solvent Fractionation of Petroselinic Acid (PSA) from *S. Olusatrum* Seed Oil Using 40-60 Petrol FFA (5 g) of the hydrolysis product of example 10 was dissolved in petrol (75 ml). The brown precipitate which formed immediately was removed by filtration and the filtrate cooled to −10° C. White crystals were observed after 24 hours. These were collected by filtration and washed with petrol (1 ml×5). The decanted and wash solutions were concentrated and cooled to −10° C. to recover further crystals which were analysed by $^{13}$C-NMR, and found to be petroselinic acid.

EXAMPLE 13

Oil (20.11 g) extracted in example 8 was dissolved in acetone (40 ml) and placed in a freezer at −10° C. The crystalline product was analysed by $^{13}$C-NMR and the melting point measured as 26.5° C. (literature for tripetroselinin, 26.2° C.).

EXAMPLE 14

Fatty Acids in Developing Seeds and Pericarp of *S. Olusatrum*

Six samples of developing seed were taken from Moel y Don, Anglesey from umbels weekly from 23.03.04 to fully ripe seeds in early June. The first five samples were crushed in a pestle and mortar but sample 6 was a hard mature seed and was cooled in liquid $N_2$ then crushed. The prepared seed was allowed to stand for one week in DCM (300 ml). All solvent extracts were dried over $MgSO_4$, filtered and solvent removed on a rotary evaporator to recover the extracted oil. $^1$H- and $^{13}$C-NMR spectra were obtained of the crude extract. The $^{13}$C-NMR spectra of the C1 and olefinic regions were used for identification of the triglyceride.

Transesterification to FAME was carried out on each of the samples by heating in methanol containing a catalytic amount of $H_2SO_4$ under reflux for 3 hours. $^1$H- and $^{13}$C-NMR spectra were obtained of the FAME. The results showed that the greatest yield of petroselinic acid was obtained when using ripe or mature seed.

EXAMPLE 15

5 g of crude fatty acid residue obtained from the seeds of *Hedera Helix* were dissolved in 10 mL acetone and cooled to 1.1° C. for 48 hours. The yellow crystals that formed were collected and recrystallised from acetone to provide 2.66 g of white crystals. The $^{13}$C NMR spectrum of the material obtained indicated that the crystals were tripetroselinin.

EXAMPLE 16

Crude oil obtained from the extraction of *S olusatrum* was dissolved in an equal volume of hexane and cooled to −10° C. After 4 hours at −10° C., white crystals had formed which were collected by filtration, washed and dried to provide the tripetroselinin product which was characterised by NMR spectroscopy. The product may be recrystallised to improve the purity thereof if necessary.

The invention claimed is:

1. A method of obtaining a solid component rich in a petroselinic compound from the seed of *Smyrnium olusatrum* or *Hedera helix*, the method comprising:

(a) treating a portion of the seed with an extraction solvent; and (b) inducing formation of the solid component, wherein the solid component comprises at least 90 wt % tripetroselinin.

2. A method according to claim 1 wherein the extraction solvent is selected from acetone, dichloromethane, tertiary-butyl methyl ether, hexane and 40-60 petrol.

3. A method according to claim 1 wherein step (a) comprises heating the portion of the seed in the extraction solvent.

4. A method according to claim 1 wherein step (b) comprises inducing crystallisation of the solid component.

5. A method according to claim 1 wherein step (b) comprises cooling the material extracted in step (a) in a cooling solvent.

6. A method according to claim 5 wherein the cooling solvent is selected from hexane, 40-60 petrol and acetone.

7. A method according to claim 1 which includes a hydrolysis step.

8. A method according to claim 1 which includes an esterification step.

9. A method of obtaining a solid component rich in a petroselinic compound from the seed of *Smyrnium olusatrum* or *Hedera helix*, the method comprising:

(a) treating a portion of the seed with an extraction solvent; and (b) inducing formation of the solid component; and (c) a hydrolysis step carried out after step (a) or step (b), wherein the solid component comprises at least 90 wt % petroselinic acid.

10. The method of claim 9, wherein the extraction solvent is selected from acetone, dichloromethane, tertiarybutyl methyl ether, hexane and 40-60 petrol.

11. The method of claim 9, wherein step (a) comprises heating the portion of the seed in the extraction solvent.

12. The method of claim 9, wherein step (b) comprises inducing crystallisation of the solid component.

13. The method of claim 9, wherein step (b) comprises cooling the material extracted in step (a) in a cooling solvent.

14. A method according to claim 9 wherein the solid component obtained comprises at least 90 wt % of an ester of petroselinic acid and a monoalcohol having 1 to 4 carbon atoms.

* * * * *